United States Patent
Gruber

(10) Patent No.: US 6,464,133 B1
(45) Date of Patent: Oct. 15, 2002

(54) PROPERTY MANAGEMENT SYSTEM

(75) Inventor: Robert M. Gruber, Camarillo, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 148 days.

(21) Appl. No.: 09/597,379

(22) Filed: Jun. 19, 2000

(51) Int. Cl.$^7$ .............................................. G06F 17/00
(52) U.S. Cl. ....................... 235/375; 235/385; 235/383; 705/8; 705/22; 705/28; 705/29
(58) Field of Search ................ 705/8, 22, 28, 705/29; 235/383, 385, 375

(56) References Cited

U.S. PATENT DOCUMENTS 5,319,544 A * 6/1994 Schmerer et al. ............ 364/403
5,380,994 A * 1/1995 Ray .............................. 235/472
5,404,442 A * 4/1995 Foster et al. ................. 359/159
5,883,370 A * 3/1999 Walker et al. ................ 235/375

FOREIGN PATENT DOCUMENTS

EP          847865 A2 * 6/1998 ............ B41J/3/407

OTHER PUBLICATIONS

Bruce Brown "Itemize Your Life Using the Barcode Anything System 3.0" Computer Shopper, Dec. 31, 1997.*
L. Scott Hochberg Consulting Services www.postagesaver.com Secret Barcoder Ring Software, copyright 1999.*
"Bar–One Software", Zebra TechnologiesVernon, Hills, IL —available at http://www.zebra.com.*

* cited by examiner

Primary Examiner—Michael G. Lee
Assistant Examiner—Daniel Hess
(74) Attorney, Agent, or Firm—David Kalmbaugh

(57) ABSTRACT

A system and method for managing property using a program designed to assist a user in completing necessary forms. The program assists the user by providing hints, overlaying text, and troubleshooting suggestions. The user is guided through each segment of a form to minimize the possibility of human error. The program provides a means for converting human readable text to a barcode. The completed form is downloaded and printed by any type of printer, such as dot matrix, laser jet, inkjet or bubblejet.

12 Claims, 5 Drawing Sheets

| 1 | 2 | 3 | 4 | 5 | 6 | 7 | 2 2 3 4 | 2 2 4 5 | 2 2 5 6 | 2 2 6 7 | 2 2 7 8 | 2 2 8 9 | 4 5 | 4 4 6 7 | 4 4 7 8 | 4 4 8 9 | 4 5 9 0 | 5 1 | 5 5 1 2 | 5 5 2 3 | 5 5 3 4 | 5 5 4 5 | 5 5 5 6 | 5 5 6 7 | 5 5 7 8 | 5 5 8 9 | 5 6 9 0 | 6 6 0 1 | 6 6 1 2 | 6 6 2 3 | 6 6 3 4 | 6 6 4 5 | 6 6 5 6 | 6 6 6 7 |
|---|---|---|---|---|---|---|---|---|---|---|---|---|---|---|---|---|---|---|---|---|---|---|---|---|---|---|---|---|---|---|---|---|---|---|
| D O C | I D E N T | | | | RI FROM | M & S | U N I T | QUANTITY | | | | | | SER | SUPPLEMENTARY ADDRESS | | | | SIG | FUND | DIS-TRI-BU-TION | | | PRO-JECT | | | PRI | RE-QD DEL | AD V | |

24. DOCUMENT NUMBER & SUFFIX (30-44)

25. NATIONAL STOCK NO. & ADD (8-22)

26. RIC (4-6)
UI (23-24)
QTY (25-29)
CON CODE (71)
DIST (55-56)
UP (74-80)

27. ADDITIONAL DATA

DD FORM 1348-1A, JUL 91 (EG) ISSUE RELEASE/RECEIPT DOCUMENT

| 6 7 7 7 7 7 7 7 8 | UNIT PRICE | | 1.TOTAL PRICE | 2.SHIP FROM | 3.SHIP TO |
|---|---|---|---|---|---|
| 6 7 7 7 7 7 7 7 8 | | | | | |
| 8 9 0 1 2 3 4 5 6 7 8 9 0 | DOLLARS | CTS | DOLLARS | | |
| RI | O/P | COND | | 4.MARK FOR | |
| | 5.DOC DATE | 6.NMFC | 7.FRT RATE | 8.TYPE CARGO | 9.P3 |
| | 10.QTY REC'D | 11.UP | 12.UNIT WEIGHT | 13.UNIT CUBE | 14.UFC | 15.SL |
| | 16.FREIGHT CLASSIFICATION NOMENCLATURE | | | | |
| | 17.ITEM NOMENCLATURE | | | | |
| | 18.TY CONT | 19.NO CONT | 20.TOTAL WEIGHT | 21.TOTAL CUBE | |
| | 22.RECEIVED BY | | | 23.DATE RECEIVED | |

PROPERTY MANAGEMENT SYSTEM

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

1. Field of the Invention

The present invention relates to a property management system. More particularly, the present invention relates to a property management system, which assists personnel in completing a form that is required for the disposal of property.

2. Description of the Prior Art

In modern business practices, maintaining an accurate inventory of merchandise is crucial. In the past, taking an inventory was an entirely manual process, and therefore slow and expensive. Modem automated inventory systems have improved the accuracy and speed of this process while reducing its cost. As businesses grow, the need to accurately detail the transfer of various property becomes more vital as businesses seek to efficiently manage all assets.

Bar coding used for the identification of employees, tools, parts, etc. is now a well-known and proven input technology. Use of bar code scanning for data entry is rapidly replacing the keyboard, the once dominant input technology in many applications.

This swift change is the result of several factors. With bar code scanning, overall data entry performance improves because the equipment is easy to use. Less labor is involved, since typing is not required. Because there is no typing, spelling errors and other "typos" are essentially eliminated. Accuracies of over 99% are the norm. Language barriers are non-existent; in fact, reading ability may not even be a factor as audible signals replace text as the means to indicate successful/unsuccessful completion of data entry.

While the use of bar codes in the United States dates from the 1950's, only recently has bar code technology been combined with another well-known and proven technology, the database. By combining these technologies, powerful features can exist for collecting data and utilizing the database for processing the data.

Numerous innovations for inventory systems have been provided in the prior art that are described as follows. Even though these innovations may be suitable for the specific individual purposes to which they address, they differ from the present invention as hereinafter contrasted.

In U.S. Pat. No. 4,972,318 issued to Brown et al. on Nov. 20, 1990, a method of order entry, product selection and inventory control for building products, building accessories and building product components is described. In U.S. Pat. No. 5,319,544 issued to Schmerer et al. on Jun. 7, 1994, a system and method for monitoring and verifying inventory is provided which comprises a portable computer with a printer and a modem "cabled" together and maintained in a carrying case. In U.S. Pat. No. 5,380,994 issued to Ray on Jan. 10, 1995, a portable microcomputer inventory system is disclosed which includes a plurality of components and a support for supporting the components on an user as the user inventories items that have a bar code thereon. In U.S. Pat. No. 5,404,442 issued to Foster et al. on Apr. 4, 1995, a text, graphic or other selected objects of a computer screen are selected and converted into a "visual clipboard" which is attached to a convenient boundary of the screen.

The above described patented inventions differ from the present invention because the patented inventions lack one or more of the following features: explanatory text and help features, a unique document number created from various codes, a program compatible with all types of printers, a program capable of duplicating an entire form and computer software having a computer software inventory therein.

Numerous innovations for equipment management systems have been provided in the prior art that are adapted to be used. Even though these innovations may be suitable for the specific individual purposes to which they address, they would not be suitable for the purposes of the present invention as heretofore described.

SUMMARY OF THE INVENTION

One object of a preferred embodiment of the present invention is to provide a system and method for assisting a user in completing a form. More particularly, another object of a preferred embodiment of the present invention is to provide a system and method that records information on an equipment disposal form for managing property. Also, the property management system incorporates a program, which can convert human readable text to a barcode. The property management system of the present invention is described as it pertains to form DD 1348-1A.

In carrying out the above objects of the present invention, a system is provided for setting up various help features to assist the user in completing a form. Those help features include colored overlaying text, hints and troubleshooting. The overlaying text allows a user to view the assistance features in fields of a computer screen layout, but the overlaying text will not appear on a final printed copy. The overlaying text is a different color from the text of the form, so the user may distinguish between the text. The hints assist the user in entering codes, numbers and other information. The troubleshooting feature lists frequently encountered problems and suggests a possible solution.

Advantages of the preferred embodiments include:

Automatic duplication of a form

Converting human readable text to a barcode

Providing various codes and acronyms for user assistance

Anticipating problems and providing the user with possible solutions

Creating a user-friendly system, which permits easy completion of a form

Inserting commonly used information into various sections of a form

Providing access to various codes and code definitions

Enabling the user to print a form to virtually any type of printer

BRIEF DESCRIPTION OF THE DRAWINGS

FIG. 1a is a pictorial representation of the left side portion of form DD 1348-1A.

FIG. 1b is a pictorial representation of the right side portion of form DD 1348-1A.

Figure 2A:
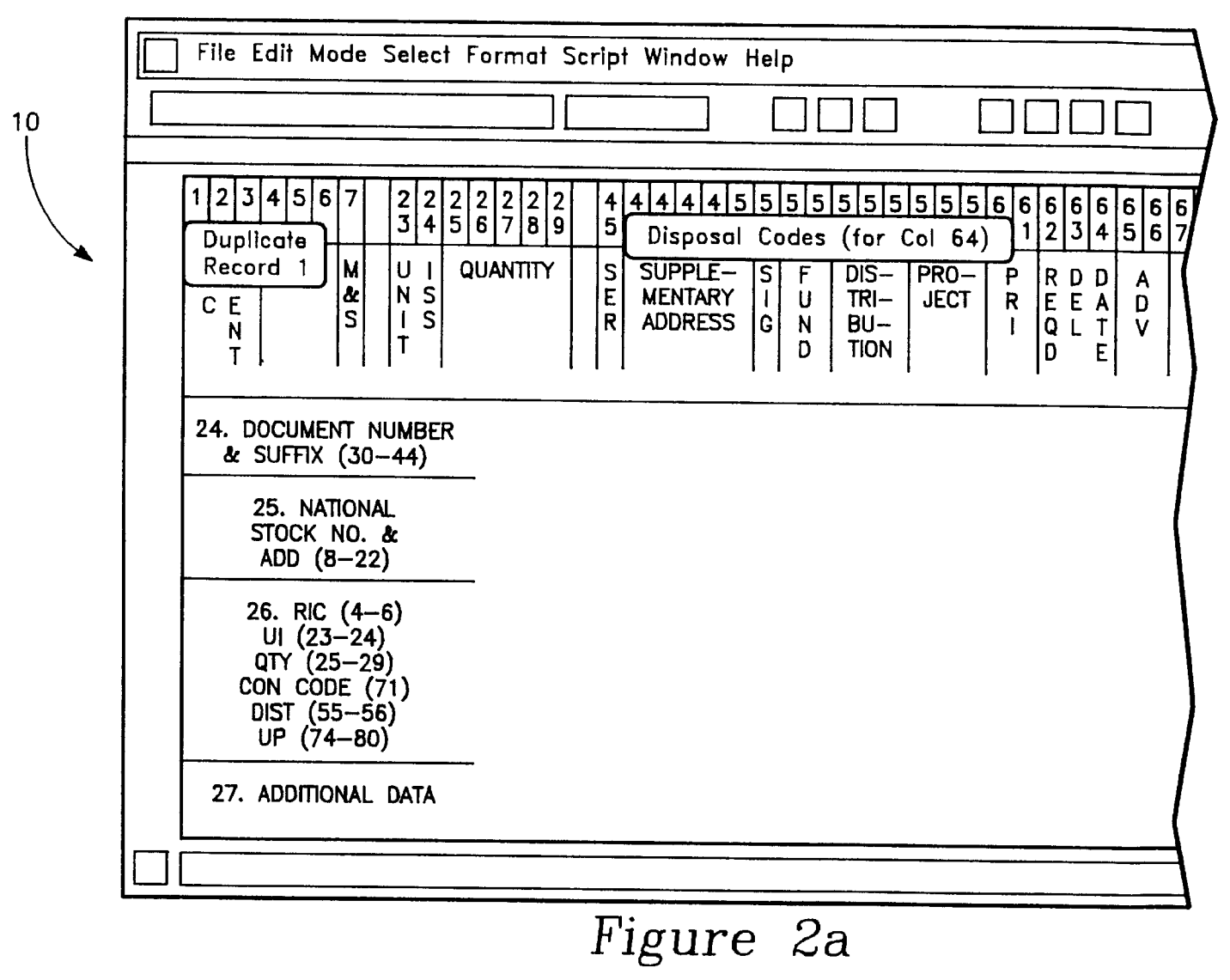
Figure 2B:
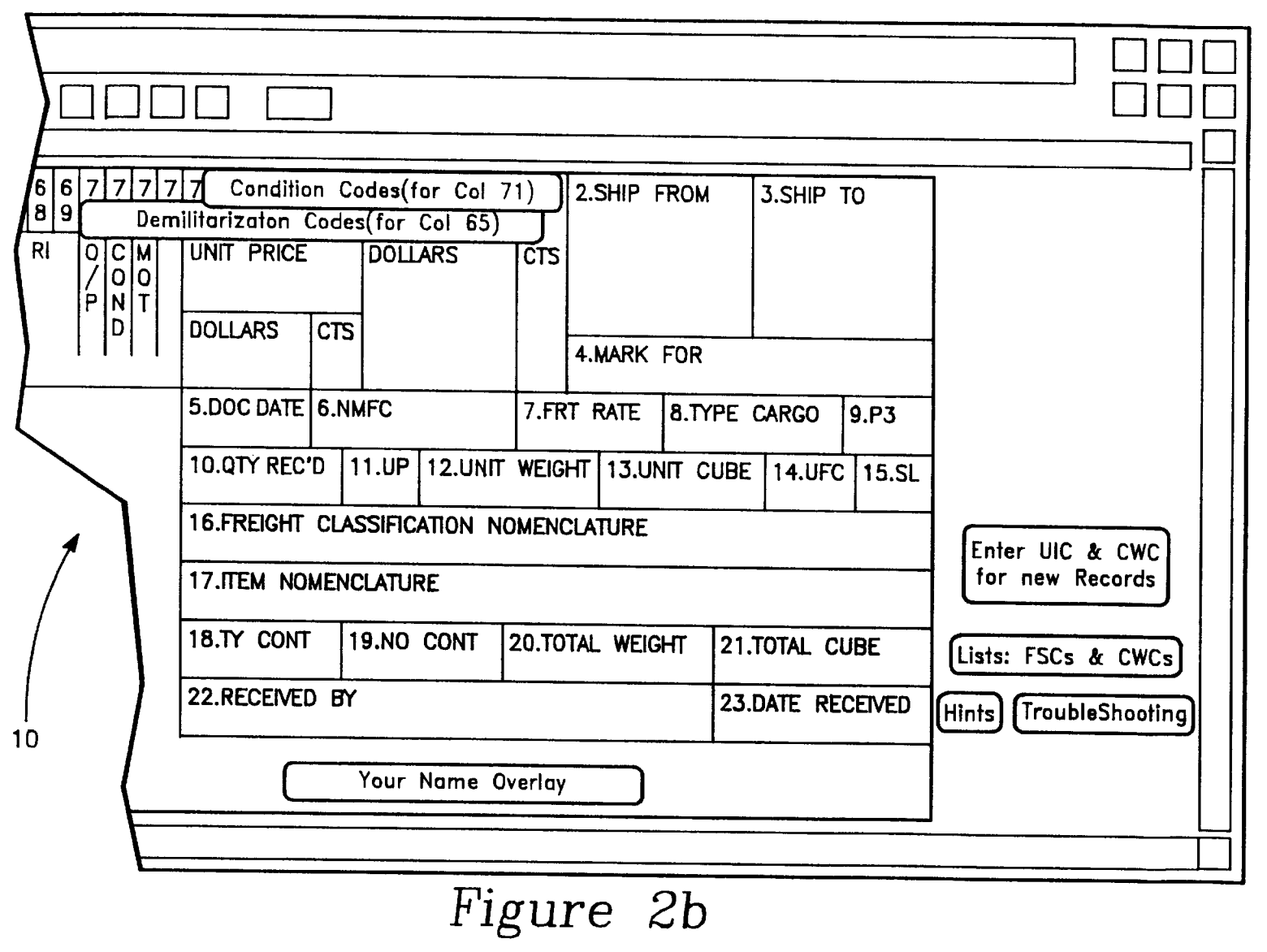

FIG. 2a is a pictorial representation of the left side portion of the screen layout of a preferred embodiment of the present invention, which includes help features and explanatory text of a preferred embodiment of the present invention.

FIG. 2b is a pictorial representation of the right side portion of the screen layout of a preferred embodiment of the present invention, which includes help features and explanatory text of a preferred embodiment of the present invention.

FIG. 3 is a pictorial representation of the left side portion of form 1348-1A, which includes help features and bar codes of a preferred embodiment of the present invention.

DETAILED DESCRIPTION OF THE INVENTION

Referring first to FIGS. 1a and 1b there is shown form DD 1348-1A Issue Release/Receipt Document 10. The form 10 is a required form used in connection with the disposal of equipment. The form 10 contains information relating to the equipment to assist office managers, other employees, and a central office in tracking equipment. A preferred embodiment of the present invention provides a system and method for assisting a user in completing the form 10.

In a preferred embodiment of the present invention, the system is designed for use on FILEMAKER PRO® 4.0 or higher. The primary layout/screen is an image of the DD 1348-1A form 10. Questions marks or explanatory text are overlaid in each field that requires an entry. These items remind the user where to make entries. The program calculates the total price by multiplying the Quantity by the Unit Price. Several other layouts/screens provide context-sensitive help by listing and explaining the possible entries for the given field. Another layout/screen allows one-time entry of Unit Identification Code (UIC) and Compressed Work Center (CWC)—if any—that are incorporated in the Document Number and that repeat on each form/document. If the user's organization doesn't use a CWC, but instead uses all four (4) of the last positions of the Document Number as a sequence number, the user is instructed to enter "??" as the CWC. These will serve as a reminder to use all four (4) positions as a sequence number. This data is automatically entered on each new document. Should the information change, clicking the button returns the user to that layout/screen to update the entered data. The updated user-specific information will be used on newly created documents, but will not alter the existing records/documents.

Record one (1) serves as a template for future records. After a one-time entry of user-specific information such as name and address in record 1, the user clicks the "Duplicate Record 1" button to create a copy of the template record. Thus, the data in record 1 become defaults for future records. The program automatically builds some fields, either completely or partially: for Block 5 it uses the date in the computer to create the Julian date; for Block 24 two (2) of three (3) elements of the Document Number—the Unit Identification Code (UIC) and Julian date—are entered automatically. The Tab key may then be used to aid orderly data entry in the new record The program incorporates the 3 of 9 barcode font. The user enters human-readable text and the program creates the barcode. The Document Number is always barcoded. The program distinguishes between Local Stock Numbers (LSNs) and National Stock Numbers (NSNs), with only NSNs being barcoded. To aid the user in constructing the LSN, the program provides a list of common Federal Supply Classes (FSCs), a 4-digit code, and the equipment each code encompasses.

The program of the present invention is able to print to any printer, such as laserjet, inkjet, bubblejet, or dot matrix, so long as, the printer is supported by WINDOWS 3x®, WINDOWS NT®, or WINDOWS 9X®.

The step by step operating instructions are as follows:

Initialization Usage
1. Launch FILEMAKER PRO®.
2. Open the 1348-1A.fp3 file.
3. Use the "Enter UIC & CWC" button (illustrated in FIG. 2a) to go to the layout/screen for one-time UIC & CWC entry.
4. Enter UIC & CWC.
5. Use the "Return" button to return to the primary layout/screen.
6. In Block 2 of record 1, the template record, enter your name, organization code, and address.
7. In the field in the lower right of record 1, enter your name, organization code, address, and phone number, and annotate a line (by underlining) for your Point of Contact (POC) signature. The field, which is illustrated in FIG. 2b, is designated as "your name overlay".

Normal Usage
1. Launch FILEMAKER PRO®.
2. Open the 1348-1A.fp3 file.
3. Use the "Duplicate Record 1" button to create a new record.
4. Use the Tab key to complete data entry, using context-sensitive help as needed.
5. Print the form.
6. For additional items/disposal documents, go to Step 3.

To better describe the operation of the property management system of the present invention, the utility as it pertains to the DD 1348-1A form is detailed and its use at the Naval Air Warfare Center Weapons Division at Point Mugu, Calif. The following description is not intended to limit the possible utilities of the present invention. The DD 1348-1A form 10 contains numbered columns 1–3, 4–6, 7, 23–24, 25–29, 45, 46–50, 51, 52–53, 54–56, 57–59, 60–61, 62–64, 65–66, 62–69, 70, 71, 72, 73, and 74–80. Those columns correspond to various information. However, several of the columns are not used, when filling out the form 10 as it relates to the disposal application for equipment. The columns are as follows:

| Column (s) | Column Title | Definition |
|---|---|---|
| 1–3 | | Doc Ident Unused in Disposal application. |
| 4–6 | RI From | Unused in Disposal application. |
| 7 | M & S | Unused in Disposal application. |
| 23–24 | Unit Iss | Unit of Issue. A pull-down list provides the choices, such as EA for each, PG for package, FT for foot, etc. The program uses a default value of "EA". The user can access the list by clicking below "Unit Iss" on the default value. |
| 25–29 | Quantity | Quantity. The number of items being transferred to the Defense Reutilization and Marketing Office (DRMO), i.e. being disposed of by the issuing organization. The program uses a default value of "1". |
| 45 | Ser | Unused in Disposal application. |
| 46–50 | Supplementary Address | Address of the recipient specified in the form of the Unit Identification Code (UIC), a 6-character code issued at the Federal level to identify organizational units. |
| 51 | Sig | Unused in Disposal application. |
| 52–53 | Fund | Unused in Disposal application. |
| 54–56 | Distribution | Unused in Disposal application. |
| 57–59 | Project | Unused in Disposal application. |
| 60–61 | Pri | Unused in Disposal application. |
| 62–64 | Reqd Del Date | Required Delivery Date. Usurped in the Disposal application for indicating the Disposal Code in column 64. The program has a pull-down list and a |

-continued

| Column(s) | Column Title | Definition |
|---|---|---|
| | | button for user access that provides an explanation for each code. The program uses a default value of "N". |
| 65–66 | ADV | Advice Code. Usurped in the Disposal application for indicating the Demilitarization Code in column 65. The program has a pull-down list and a button for user access that provides an explanation for each code. The program uses a default value of "A". |
| 67–69 | RI | Unused in Disposal application. |
| 70 | O/P | Unused in Disposal application. |
| 71 | Cond | Condition Code. The program has a pull-down list and a button for user access that provides an explanation for each code. |
| 72 | MGT | Unused in Disposal application. |
| 74–80 | Unit Price | the unit price of the item(s) being disposed of. Entry is in dollars and cents. The program does not insert a default value. |

The Unit of Issue contained in columns 23–24 of the 1348-1A disposal form 10 is an abbreviation of the types of units under which material is issued. A list of Unit of Issue abbreviations are as follows, as listed in Table 2:

TABLE

| Code | Description | Code | Description | Code | Description |
|---|---|---|---|---|---|
| AM | Ampoule | FT | Foot | PT | Pint |
| AT | Assortment | FV | Five | PZ | Packet |
| AY | Assembly | FY | Fifty | | |
| | | | | QT | Quart |
| BA | Ball | GL | Gallon | | |
| BD | Bundle | GP | Group | RA | Ration |
| BE | Bale | GR | Gross | RL | Reel |
| BF | Board Foot | | | RM | Ream |
| BG | Bag | HD | Hundred | RO | Roll |
| BK | Book | HK | Hank | | |
| BL | Barrel | | | SD | Skid |
| BO | Bolt | IN | Inch | SE | Set |
| BR | Bar | | | SF | Square Foot |
| BT | Bottle | JR | Jar | SH | Sheet |
| BX | Box | | | SK | Skein |
| | | KT | Kit | SL | Spool |
| CA | Cartridge | | | SO | Shot |
| CB | Carboy | LB | Pound | SP | Strip |
| CD | Cubic Yard | LG | Length | SX | Stick |
| CE | Cone | LI | Liter | SY | Square Yard |
| CF | Cubic Foot | | | | |
| CK | Cake | MC | Thousand Cubic Feet | TD | Twenty-four |
| CL | Coil | ME | Meal | TE | Ten |
| CN | Can | MR | Meter | TF | Twenty-five |
| CO | Container | MX | Thousand | TN | Ton |
| CY | Cylinder | | | TO | Troy Ounce |
| CZ | Cubic Meter | OT | Outfit | TS | Thirty-six |
| | | OZ | Ounce | TU | Tube |
| DR | Drum | | | | |
| DZ | Dozen | PD | Pad | VI | Vial |
| | | PG | Package | | |
| EA | Each | PM | Plate | YD | Yard |
| | | PR | Pair | | |

To better describe the operation of the property management system of the present invention, the utility as it pertains to the needs of the Naval Air Warfare Center Weapons Division at Point Mugu, Calif. will be detailed. The following description is not intended to limit the possible utilities of the present invention. In a preferred embodiment of the present invention, Disposal Authority Codes are inserted in Column 64. Disposal Authority Codes indicate items being transferred to a Defense Reutilization and Marketing Office (DRMO) are authorized to be transferred to disposal because of instructions of the IMM/ICP (Integrated Material Manager/Item Control Point) relayed through the Materiel Returns Program (MRP) or other proper authority. As illustrated in FIG. 2a, the user may access a list of Disposal Authority codes by clicking "Disposal Codes (for Col 64)". The applicable codes are listed and defined as follows:

M Items on this transaction are IMM/ICP (Integrated Materiel Manager/Item Control Point) stocks and are being transferred to disposal by authority of the responsible inventory manager.

N Items on this transaction are not reportable by virtue of an exclusion to the Materiel Returns Program (NRP) of MILSTRIP or other specific criteria such as extended dollar value or condition limitations on excess reporting and are duly authorized to be transferred to disposal.

R Items on this transaction have been reported to the IMM/ICP in accordance with MILSTRIP MRP procedures and have been directed to disposal by the inventory manager. Excess transaction status codes SF, SL, SN, TC, TD, or TX were provided by the IMM/ICP on DI Code FTR.

In a preferred embodiment of the present invention, Demilitarization Codes are inserted in Column 65. As illustrated in FIG. 2b, the user may access a list of Demilitarization Codes by clicking "Demilitarization Codes (for Col 65)". The applicable codes are listed and defined as follows:

A Non-MLI/Non-SLI—Demilitarization not required. {MLI=Munitions List Item, SLI=Strategic List Item}

B MLI (Non-SME)—Demilitarization not required. Trade Security Controls (TSCs) required at disposition.

C MLI (SME)—Remove and/or demilitarize installed key point(s), as prescribed in this manual, or lethal parts, components and accessories.

D MLI (SME)—Total destruction of item and components so as to preclude restoration or repair to a usable condition by melting, cutting, tearing, scratching, crushing, breaking, punching, neutralizing, etc. (As an alternate, burial or deep water dumping may be used when coordinated with the DOD Demilitarization Program Office.)

E MLI (Non-SME)—Additional critical items/materiel determined to require demilitarization, either key point or total destruction. Demilitarization instructions to be furnished by the DOD Demilitarization Program Office.

F MLI (SME)—Demilitarization instructions to be furnished by the Item/Technical Manager.

G MLI (SME)—Demilitarization required—AEDA. Demilitarization, and if required, declassification and/or removal of sensitive markings or information, will be accomplished prior to physical transfer to a DRMO. This code will be used for all AEDA items, including those which also require declassification and/or removal of sensitive markings or information. {AEDA= Ammunitions, Explosives, and Dangerous Articles}

P MLI (SME)—Security Classified Item—Declassification and any additional demilitarization and removal of any sensitive markings or information will be accomplished prior to accountability or physical transfer to a DRMO. This code will not be assigned to AEDA items.

Q SLI—Strategic List Item—Demilitarization not required. SLI are non-MLI and are controlled by the U.S. Department of Commerce through the Export Administration Regulations (EAR) and indicated on the Commerce Control List (CCL). Each CCL entry is preceded by a four-digit Export Control Classification Number (ECCN) and those ECCNs ending in the letter "A" or "B" are defined as Strategic List Items. These items are subject to Import Certification and Delivery Verification (IC/DV) control and other Trade Security Controls.

In a preferred embodiment of the present invention, Condition Codes are inserted in Column 71. The Condition Code indicates the condition of the equipment being disposed. As illustrated in FIG. 2b, the user may access a list of Condition Codes by clicking "Condition Codes (for Col 71)". The applicable codes are listed and defined as follows:

A Serviceable (Issueable Without Qualification). New, used, repaired, or reconditioned materiel which is serviceable and Issueable to all customers without limitation or restriction. Includes materiel with more than 6 months shelf life remaining.
B Serviceable (Issueable With Qualification). New, used, or reconditioned materiel which is serviceable and Issueable for its intended purpose, but which, is restricted from issue to specific units, activities, or geographical area by reason of its limited usefulness or short service life expectancy. Includes materiel with 3–6 months shelf life remaining.
C Serviceable (Priority Issue). Items which are serviceable and Issueable to selected customers, but which must be issued before Condition A and B materiel to avoid loss as a usable asset. Includes materiel with less than 3 months shelf life remaining.
D Serviceable (Test/Modification). Serviceable materiel which requires test, alteration, modification, conversion, or disassembly. This does not include items which must be inspected or tested immediately prior to issue.
E Unserviceable (Limited Restoration). Materiel which involves only limited expense or effort to restore to serviceable condition and which is accomplished in the storage activity where stock is located.
F Unserviceable (Reparable). Economically reparable materiel which requires repair, overhaul, or reconditioning; includes reparable items which are radioactivity contaminated.
G Unserviceable (Incomplete). Materiel requiring additional parts or components to complete the end item prior to issue.
H Unserviceable (Condemned). Materiel which has been determined to be unserviceable and does not meet repair criteria.
S Unserviceable (Scrap). Materiel that has no value except for its basic materiel content. No stock will be recorded as on hand in Condition Code S. This code is used only on transactions involving shipments to DRMOs. Materiel will not be transferred to Code S prior to turn-in to DRMOs if materiel is recorded in Code A through H at the time materiel is determined excess. Materiel identified by NSN will not be identified by this Condition Code.

Referring first to FIGS. 1 and 2, the DD 1348-1A form 10 contains numbered blocks 1 through 27. Those blocks correspond to various information. Similar to the columns, several of the blocks are unused, when filling out the form 10 as it relates to the disposal of equipment. The necessary blocks are as follows:

| Block | Block Title | Definition |
|---|---|---|
| 1 | Total Price | Total Price. The program multiples the Quantity (in columns 25–29) by the Unit Price (in columns 74–80) to arrive at the Total Price. |
| 2 | Ship From | The full address, starting with the UIC in parentheses, of the releasing/disposing organization. This data is entered one-time in record 1 and is subsequently duplicated by the program in succeeding records when the user clicks the "Duplicate Record 1" button, as illustrated in FIG. 2a. |
| 3 | Ship To | The full address, starting with the UIC in parentheses, of the receiving organization. This data is entered one-time in record 1 and is subsequently duplicated by the program in succeeding records when the user clicks the "Duplicate Record 1" button. |
| 4 | Mark For | May be the receiving organization or a person within that organization. |
| 5 | Doc Date | The Julianized Date of the item(s) being disposed of. The program automatically enters this 4-digit number when a new record is created. The entry is based on the date in the host computer. |
| 6 | NMFC | Unused in Disposal application. |
| 7 | FRT Rate | Unused in Disposal application. |
| 8 | Type Cargo | Unused in Disposal application. |
| 9 | PS | Unused in Disposal application. |
| 10 | Qty Rec'd | Unused in Disposal application. |
| 11 | UP | Unused in Disposal application. |
| 12 | Unit Weight | Unused in Disposal application. |
| 13 | Unit Cube | Unused in Disposal application. |
| 14 | UFC | Unused in Disposal application. |
| 15 | SL | Unused in Disposal application. |
| 16 | Freight Classification Nomenclature | Unused in Disposal application. |
| 17 | Item Nomenclature | Name of the item(s) being disposed of. Brief (about 30 characters or less), high-level description of the item(s). |
| 18 | TY CONT | Unused in Disposal application. |
| 19 | NO CONT | Unused in Disposal application. |
| 20 | Total Weight | Unused in Disposal application. |

-continued

| Block | Block Title | Definition |
|---|---|---|
| 21 | Total Cube | Unused in Disposal application. |
| 22 | Received By | The receiving official at DRMO enters his/her name. |
| 23 | Date Received | The receiving official at DRMO enters the date. |
| 24 | Document Number & Suffix (30–44) | Document Number in the form: 6-character UIC--4-digit Julian Date--nnnn, where nnnn is a sequence number for that date. |
| 25 | National Stock No. & ADD (8–22) | The National Stock Number (NSN), if any, or in its absence, a made up Local Stock Number (LSN). The NSN is the 13-digit number issued to national/federal stock items. The format is: nnnn-nn-nnn-nnnn. There are three (3) parts to a LSN: the 4-digit Federal Supply Class (FSC), "00", and the Nomenclature of the item. |
| 26 | RIC (4–6) | Unused in Disposal application. |
|  | UI (23–24) | Unused in Disposal application. |
|  | QTY (25–29) | Unused in Disposal application. |
|  | CON CODE (71) | Unused in Disposal application. |
|  | DIST (55–56) | Unused in Disposal application. |
|  | UP (74–80) | Unused in Disposal application. |
|  | REMARKS | In the Disposal application, Block 26 has been usurped for additional remarks such as certifying that a computer's hard disk has been degaussed. |
| 27 | Additional Data | In the Disposal application, Block 27 is used for the equipment's Manufacturer, Model No., Serial No., and BarCode tag (if any). |

Figure 3:
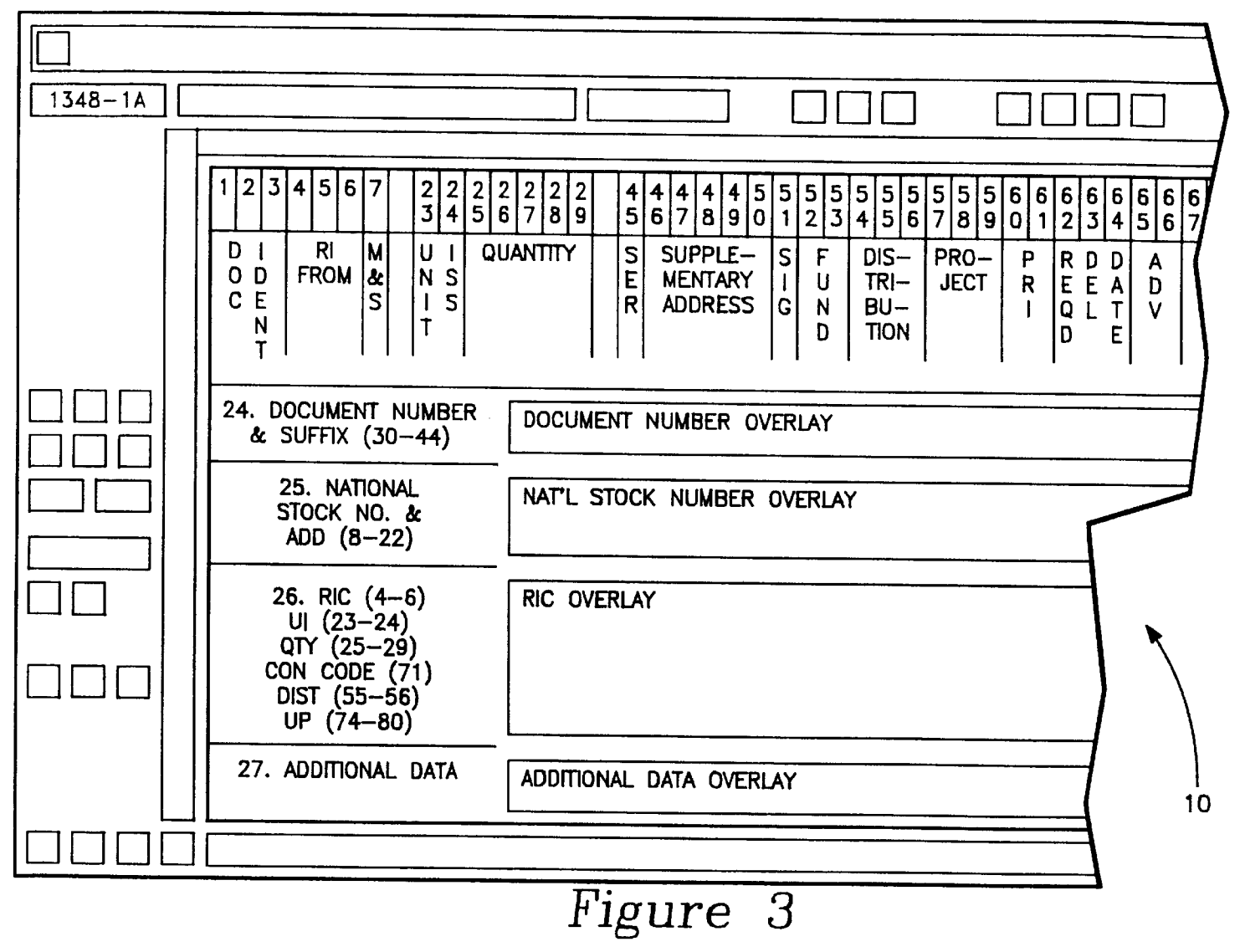

Referring to FIG. 3, the "DOCUMENT NUMBER OVERLAY" indicates where the user enters the data required in block 24; the "NAT'L STOCK NUMBER OVERLAY" indicates where the user enters the data required in block 25; the "RIC OVERLAY" indicates where the user enters additional remarks in block 26; and the "ADDITIONAL DATA OVERLAY" indicates where the user enters the data for block 27.

As indicated above, to better describe the operation of the property management system of the present invention, the utility as it pertains to the Naval Air Warfare Center Weapons Division at Point Mugu, Calif. will be detailed. The following description is not intended to limit the possible utilities of the present invention. The property management system program enables the user to access help features that assist the user in completing the form. In a preferred embodiment of the present invention, one help feature is accessed by clicking "Hints", as illustrated in FIG. 2b. "Hints" reveals the following assistance for the user.

Hints on Selected Fields

Columns 25–29, Quantity: 5 digits. Use leading zeros (0s).
Columns 45–50, Supplementary Address: DRMO Port Hueneme=SZ3189
Columns 74–80, Unit Price: Original unit cost or closest estimate of value at purchase.
Block 2, Ship From: put your UIC in parens on line 1; put your full address on lines 2-n.
Block 3, Ship To:
  DRMO Pt. Hueneme lists 779 Stethem Road as its address. That's its mailing address, physical location is Bldg 526
  (SZ3189)
  DRMO Pt. Hueneme
  779 Stethem Road, Bldg. 526
  Port Hueneme, Calif. 93043-4314
Block 5, Doc Date: Julian Date, YJJJ -->1-digit calendar year, 3-digit day-of-year (with leading zeros as needed)
Block 24, Document Number & Suffix: Sample—N63126 9001 209P—MAX of 15 characters for barcode. DRMO, Hueneme, wants the 14 characters in columns 30–43 on DD Form 1348-6 but NOT column 44, the Demand Code. Suffix probably refers to column 44. The Document Number breaks down to the 6-character UIC/Requisitioner, 4-digit (Julian) Date, and 2-digit Serial number concatenated with the 2-character Compressed Work Center (CWC). NOTE. If you are very, very careful, you may improve readability by putting a single dash (or space) between the UIC and the JDay, and a single dash (or space) between the JDay and the Serial number. This 16-char. string is allowed because the software eliminates dashes or spaces in those specific spots when it creates the barcode. If you are not the careful type, do not use dashes or spaces between the subitems; just Type all 14 characters in one continuous string.
Block 25, National Stock No. & Add: MAX of 15 characters for NSN barcode. If there is no NSN, a Local Stock Number is entered. A typical LSN is the 4-digit Commodity Code (space) 00 (space) Item name/type. Sample LSN—7021 00 COMPUTER—Local Stock Numbers are not barcoded. NOTE. For the NSN, if you are very, very careful, you may improve readability by putting a single dash (or space) in the usual spots: positions 5, 8, and 12. This 16-char. string is allowed because the software eliminates dashes or spaces in those specific spots when it creates the barcode. If you are not the careful type, do not use dashes or spaces in positions 5, 8, and 12 of the National Stock Number; just type all 13 NSN digits in one continuous string.

In a preferred embodiment of the present invention, the "Hints" page also allows the user to access "Lists". By clicking "Lists: FSCs & CWCs", as illustrated in FIG. 2b, or "Lists: Commodity Codes & FSCs" the user is presented with the following, illustrated as Table 1:

TABLE 1

Selected Commodity Codes
Common 4-digit Commodity Codes, AKA Federal Supply Classes(FSCs)

| | | | |
|---|---|---|---|
| 2310 | Passenger Motor Vehicles | 7005 | Disk Drive |
| 2320 | Trucks and Truck Tractors, Wheeled | 7010 | ADPE Systems Configuration; CPU |
| 2330 | Trailers, Mobile Homes | 7020 | Computer, Analog |
| 2340 | Motorcycles, Motor Scooters, & Bicycles | 7021 | Computer, Digital |
| 2540 | Vehicle Furniture & Accessories | 7022 | Computer, Hybrid |
| 2590 | Misc Vehicle Components | 7025 | ADP Input/Output and Storage Devices, e.g. Printers, Monitors, Tape Drives, Terminals |
| 3610 | Print, Duplicating, & Bookbinding Equip. | 7030 | ADP Software |
| 4110 | Refrigeration Equip., Refrigerators | 7032 | Multiplexer |
| 4140 | Fans, Air Circulators and Blower Equip. | 7033 | (External) Modem |
| 5110 | Hand Tools, Edged, Nonpowered | 7035 | ADP Supplies and Equipment |
| 5130 | Hand Tools, Power Driven | 7050 | ADP Components |
| 5805 | Telephone & Telegraph Equip. | 7110 | Office Furniture, Sales |
| 5815 | Teletype and Facsimile Equipment | 7125 | Cabinets, Lockers, Bins, Shelving |
| 5836 | Video Recording & Reproducing Equip. | 7195 | Miscellaneous Furniture and Fixtures |
| 6130 | Power Supplies | 7290 | Misc Household Commercial Furnish. & Appliances |
| 6135 | Batteries, Nonrechargeable | 7430 | Typewriters |
| 6140 | Batteries, Rechargeable | 7490 | Misc Office Mach |
| 6625 | Power Meter, Signal Generator, Multi-Meter, Oscilloscope | 7510 | Office Supplies |

In a preferred embodiment of the present invention, the user accesses another help feature by clicking on "TroubleShooting", as illustrated in FIG. 2b. "TroubleShooting" reveals the following:

TroubleShooting

1. When I print, the template record (Record 1), and only the template record, prints instead of the record I'm in.
Ans: In the Print dialog box two entries are of interest: the "Print:" box at the top and the "Print Range" about ⅔s of the way down. You apparently have "Records being browsed" selected in the "Print:" box. This entry needs to be "Current record". You also have "Pages from 1 to 1" selected. While this entry is not in error, "All" should work for the Disposal form. However selecting "Pages from 1 to 1" is a good way to prevent accidentally reprinting lots and lots of records if you have erroneously selected "Records being browsed".
2. When I print, all the records in the database print, not just the record I'm on.
Ans: In the Print dialog box, look at the "Print:" box at the top. You apparently have "Records being browsed" selected. This entry needs to be "Current record".

When utilizing the help features, the user may return to the form by clicking "Return". If a user has access to FedLog, the user may obtain the National Stock Number (NSN), colloquially known as a federal stock number. The NSN has the form AAAA-BB-CCC-DDDD. This number is entered in Block 25 of the DD 1348-1A. If the item to be disposed of has no NSN, the user is to make up a stock number, referred as a Local Stock Number (LSN). There are three (3) parts to a LSN: the 4-digit Federal Supply Class (FSC), "00", and the Nomenclature of the item. The Federal Supply Class (FSC) is also known as the Commodity Code. For example, the LSN for a digital computer is 7021-00-COMPUTER and the LSN for a printer is 7025-00-PRINTER.

Although the description above contains many specificities, these should not be construed as limiting the scope of the invention but as merely providing an illustration of the presently preferred embodiment of the invention. Thus the scope of this invention should be determined by the appended claims and their legal equivalents.

APPENDIX A

DD 1348-1A Program Documentation
Pertinent Field Definitions and Scripts
Pertinent Field Definitions Table

| Field Name | Field Type | Description of Field/Formula/Entry Options |
|---|---|---|
| Unit ISS w Description | Text | User selects Unit of Issue from a pop-up list of all possible 2-character entries, with the name of the entry in parentheses, e.g. EA (Each). The list starts with the 6 most likely choices, followed by a complete alphabetized list. In the template record the field is set to EA, which acts as the de facto default. |
| Unit ISS | Text (from a | If the Unit ISS w Description field is blank, displays a |

APPENDIX A-continued

DD 1348-1A Program Documentation
Pertinent Field Definitions and Scripts
Pertinent Field Definitions Table

| Field Name | Field Type | Description of Field/Formula/Entry Options |
| --- | --- | --- |
| Overlay | Calculation) | red question mark in that space. Otherwise, displays nothing. |
| Quantity | Number | User enters Quantity of item being disposed of. Program only allows values of type Number in the range 1 to 99999. In the template record the field is set to 1, which acts as the de facto default. |
| Quantity Overlay | Text (from a Calculation) | If the Quantity field is blank, displays a red question mark[1] in that space. Otherwise, displays nothing. |
| Supplementary Address (Col 46–50) | Text | User enters the Unit Identification Code (UIC) of the group receiving the items being disposed of. In the template record, the UIC for DRMO, Port Hueneme, has been entered as the de facto default. If a different DRMO is being used, the user may change the value in the template record. |
| Req'd Del Date | Text | User selects the Disposal Code from a pop-up list of all possible entries. In the template record the field is set to "N", which acts as the defacto default. |
| Req'd Del Date Overlay | Text (from a Calculation) | If the Req'd Del Date field is blank, displays a red question mark[1] in that space. Otherwise, displays nothing. |
| ADV | Text | User selects the Demilitarization Code from a pop-up list of all possible entries. In the template record the field is set to "A", which acts as the de facto default. |
| ADV Overlay | Text (from a Calculation) | If the ADV field is blank, displays a red question mark[2] in that space. Otherwise, displays nothing. |
| Cond | Text | User selects the Condition Code from a pop-up list of all possible entries. Since no one choice predominates, there is no default value and no entry in the template record to act as a de facto default. |
| Cond Overlay | Text (from a Calculation) | If the Cond field is blank, displays a red question mark in that space. Otherwise, displays nothing. |
| Unit Dollars | Number | User enters the whole dollars portion of the original value of the item being disposed of. Program only allows values of type Number. |
| Unit Dollars Overlay | Text (from a Calculation) | If the Unit Dollars field is blank, displays a red question mark[2] in that space. Otherwise, displays nothing. |
| Unit Cents | Number | User enters the cents portion of the original value of the item being disposed of. Program only allows values of type Number in the range 0 to 99. |
| Unit Cents Overlay | Text (from a Calculation) | If the Unit Cents field is blank, displays a red question mark[2] in that space. Otherwise, displays nothing. |
| Unit Price | Number (from a Calculation) | Program computes Unit Price as: (Unit Dollars + Unit Cents/100), rounded to 2 decimal places. |
| Total Price | Number (from a Calculation) | Program computes Total Price as: Unit Price * Quantity), rounded to 2 decimal places. |
| Total Cents | Number (from a Calculation) | Program computes Total Price Cts as: the result of the modulus function of (Total Price * 100, 100) rounded to 0 decimal places. |
| Total Dollars | Number (from a Calculation) | Program computes Total Price Dollars as: the result of (Total Price - Total Cents/100) rounded to 0 decimal places. |
| Ship From | Text | User enters his/her address in the Ship From field (Block 2 on the form) starting with the UIC in parentheses, followed by the normal address. Typically, this address will be entered in the template record to act as the de facto default. |
| Ship From Overlay | Text (from a Calculation) | If the Ship From field is blank or contains the UIC only, displays "your full address " in red in that space. Otherwise, displays nothing. |
| Ship To (Blk 3) | Text | User enters DRMO's address in the Ship To field starting with DRMO's UIC in parentheses, followed by the normal address. The UIC and address of the Port Hueneme DRMO have been entered in the template record to act as the de facto default. |
| | Text | User enters the organization or person to receive the item(s) in the Mark For field. "DRMO Port Hueneme" has been entered in the template record to act as the de facto default. |
| JDay | Text (from a Calculation) | The program uses the date in the computer to calculate the Julian Date as: the last digit of the year concatenated with the 3-digit day of year. |

APPENDIX A-continued

DD 1348-1A Program Documentation
Pertinent Field Definitions and Scripts
Pertinent Field Definitions Table

| Field Name | Field Type | Description of Field/Formula/Entry Options |
| --- | --- | --- |
| Doc Date | Text | The "Dup Record 1" script sets the Doc Date field (Block 5) to the value: JDay. If the user prefers a different JDay, he/she may enter it in lieu of the calculated value. |
| Doc Date Overlay | Text (from a Calculation) | If the Doc Date field is blank, displays "JDay" in red[3] in that space. Otherwise, displays nothing. |
| Item Nomenclature (Blk 17) | Text | For the item being disposed of, the user enters a brief, high-level description, the Item Nomenclature. |
| Item Nomenclature Overlay | Text (from a Calculation) | If the Item Nomenclature (Blk 17) field is blank, displays "Nomenclature here" in red[3] in that space. Otherwise, displays nothing. |
| Document Number | Text | In Block 24, user enters the unique Document Number composed of 3 components: the user's 6-character UIC, the 4-digit JDay, and a 4-digit serial number on that JDay. The UIC defaults to the value the user entered at 1$^{st}$ usage of the program. The JDay is automatically computed from the date in the computer. Thus, the user needs only enter the 4-digit serial number. The program uses a validation formula to give the user feedback on the entry of illegal characters. |
| Document Number Overlay | Text (from a Calculation) | If the serial number portion of the Document Number field is blank, displays data entry guidance in red below the Document Number field. Otherwise, displays nothing. |
| Document Number BarCode | Text (from a Calculation) | Program automatically converts the human readable Document Number into the 3 of 9 barcode. |
| National Stock Number | Text | User enters the 13-digit National Stock Number in Block 25 on the form. If the item has no National Stock Number, the user creates and enters a Local Stock Number consisting of the Federal Supply Class (FSC), the digits 00, and the Nomenclature of the item. The program uses a validation formula to give the user feedback on the entry of illegal characters. |
| National Stock Number Overlay | Text (from a Calculation) | If the National Stock Number field is blank, displays data entry guidance in red[4] in that space. Otherwise, displays nothing. |
| National Stock Number BarCode | Text (from a Calculation) | If the entry in the National Stock Number field contains exactly 13 digits, the program automatically converts it into the 3 of 9 barcode. Otherwise, it displays nothing. |
| RIC | Text | In the Disposal application Block 26 has been usurped for additional remarks, such as certifying that a computer's hard disk has been degaussed. |
| RIC Overlay | Text (from a Calculation) | Displays data entry guidance (in red[4]) if the user has made no entry in the RIC field. |
| Additional Data | Text | In the Disposal application Block 27 is used to list the equipment's Manufacturer, Model No., Serial No., and BarCode tag (if any). |
| Add'l Data Overlay | Text (from a Calculation) | Displays data entry guidance (in red[4]) if the user has made no entry in the Additional Data field. |
| Disposing Official w Addr | Text | In the open area in the lower right of form, the user enters the Point of Contact's name, address, and phone #, and underlines a line for the POC's signature. Typically, this information will be entered in the template record to act as the de facto default. |
| Disposer Overlay | Text (from a Calculation) | Displays data entry guidance (in red) if the user has made no entry in the Disposing Official w Addr field. |
| gt_Disposal Authority Codes | Text | Contains the text for the Help Screen for the Disposal Authority Codes. |
| gt_Demilitarization Codes | Text | Contains the text for the Help Screen for the Demilitarization Codes. |
| gt_Condition Codes | Text | Contains the text for the Help Screen for the Condition Codes. |
| UIC | Text | User may click an on-screen button (Enter UlC & CWC for new Records) that allows entry of the Unit Identification Code (UIC) into the template record, in essence, setting that entry as the default value. The user is advised to make this entry the very 1$^{st}$ time he/she uses the program. |
| CWC | Text | User may click an on-screen button (Enter UIC & CWC for new Records) that allows entry of the Compressed |

APPENDIX A-continued

DD 1348-1A Program Documentation
Pertinent Field Definitions and Scripts
Pertinent Field Definitions Table

| Field Name | Field Type | Description of Field/Formula/Entry Options |
|---|---|---|
| | | Work Center (CWC) into the template record, in essence, setting that entry as the default value. The user is advised to make this entry the very 1$^{st}$ time he/she uses the program. |
| gt_FSCs 1 | Text | Contains the text for the left column of the Help Screen with selected Federal Supply Classes (FSCs) that are a component of the National Stock Number (NSN) and Local Stock Number (LSN). |
| gt_FSCs 2 | Text | Contains the text for the right column of the Help Screen with selected Federal Supply Classes (FSCs) that are a component of the National Stock Number (NSN) and Local Stock Number (LSN). |
| gt_Form Hints | Text | Contains the text for the Help Screen with data entry help/hints for the various columns and block entries. |
| gt_TroubleShooting | Text | Contains the text for the Troubleshooting Help Screen. |
| gt_Ver Num & Date | Text | Contains the text with the Version Number and Date of the version of the disposal form being used. |

What is claimed is:

1. A computer-based program system for managing property comprising:
    means for entering information relating to quantity, monetary value, transfer date and other data with regard to said property, said information being entered into a first screen layout which corresponds to a printable form, wherein said first screen layout depicts a property disposal form, the property disposal form depicted on said first screen allowing a user of said computer-based system to track said property through a property disposal process;
    first program means for converting readable text to a first barcode, wherein said first barcode identifies said property by a document number;
    second program means for converting said readable text to a second barcode, wherein said second barcode identifies said property by a federal stock number;
    means for overlaying explanatory text in a plurality of fields of the first screen layout, wherein said explanatory text consists of said information required in each of said plurality of fields; and
    means for printing the first screen layout, wherein the first screen layout comprises said information regarding said property.

2. The computer-based system of claim 1 further comprising means for duplicating the first screen layout to produce a second screen layout identical to the first screen layout.

3. The computer-based system of claim 1 wherein said first program means is a 3 of 9 barcode font program.

4. The computer-based system of claim 1 wherein said second program means is a 3 of 9 barcode font program.

5. The computer-based system of claim 1 wherein said document number comprises:
    a six character unit identification code, wherein said unit identification code identifies a disposer of said property;
    a four digit julian date, wherein said julian date indicates a date of disposal of said property;
    a two digit serial number; and
    a two character compressed work center assigned by a local computer.

6. The computer-based system of claim 1 further comprising means for accessing at least one help feature, wherein said help feature assists a user in entering the information required for the first screen layout.

7. A computer-based method for managing property comprising the steps of:
    entering information relating to quantity, monetary value, transfer date and other data with regard to said property, wherein said information is entered into a first screen layout which corresponds to a printable form, said first screen layout depicting a property disposal form, the property disposal form depicted on said first screen allowing a user of said computer-based system to track said property through a property disposal process;
    converting readable text to a first barcode, wherein said first barcode identifies said property by a document number;
    converting said readable text to a second barcode, wherein said second barcode identifies said property by a federal stock number;
    overlaying explanatory text in a plurality of fields of the first screen layout, wherein said explanatory text consists of said information required in each of said plurality of fields; and
    printing the first screen layout, wherein the first screen layout comprises said information regarding said property.

8. The computer-based method of claim 7 further comprising means for duplicating the first screen layout to produce a second screen layout identical to the first screen layout.

9. The computer-based method of claim 7 wherein said first program means is a 3 of 9 barcode font program.

10. The computer-based method of claim 7 wherein said second program means is a 3 of 9 barcode font program.

11. The computer-based method of claim 7 wherein said document number comprises:
    a six character unit identification code, wherein said unit identification code identifies a disposer of said property;
    a four digit julian date, wherein said julian date indicates a date of disposal of said property;
    a two digit serial number; and a two character compressed work center assigned by a local computer.

12. The computer-based method of claim 7 further comprising means for accessing at least one help feature, wherein said help feature assists a user in entering the information required for the first screen layout.

* * * * *